Feb. 7, 1950 — K. O. HUFF — 2,496,537
SELF-LOCKING CHAIN HOIST TRAILER
Filed Nov. 17, 1947 — 2 Sheets-Sheet 1
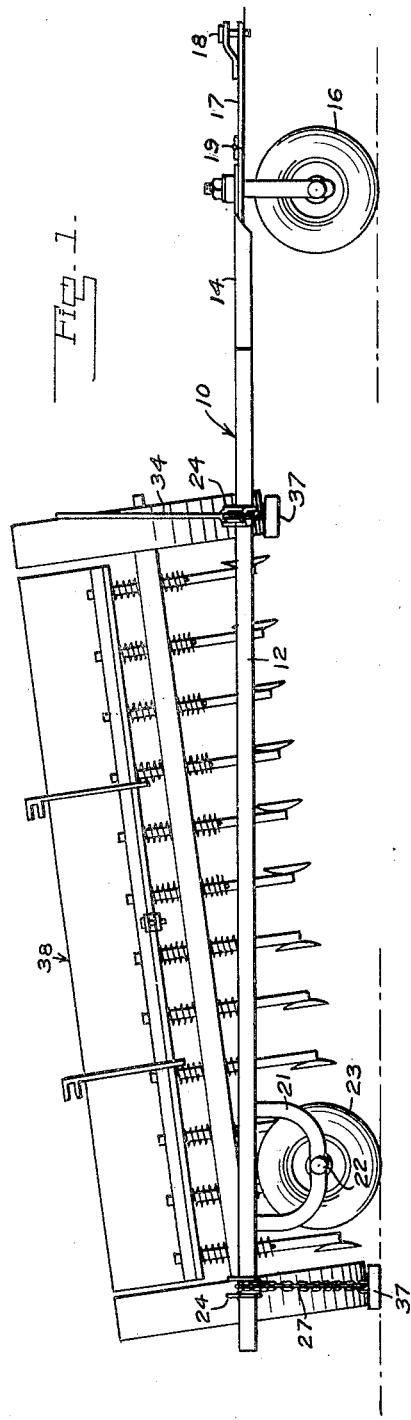
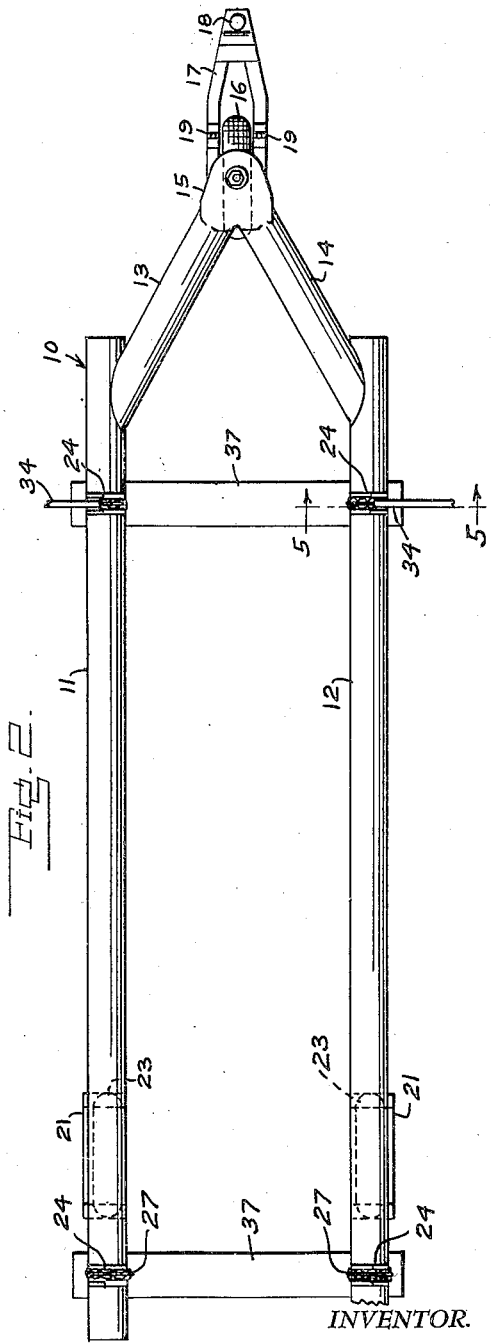
INVENTOR.
Kenneth O. Huff
BY Victor J. Evans & Co.
ATTORNEYS Feb. 7, 1950 K. O. HUFF 2,496,537
SELF-LOCKING CHAIN HOIST TRAILER
Filed Nov. 17, 1947 2 Sheets-Sheet 2
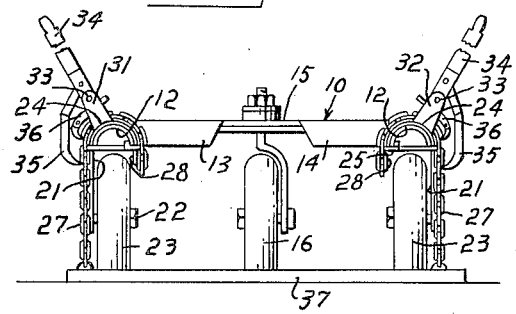
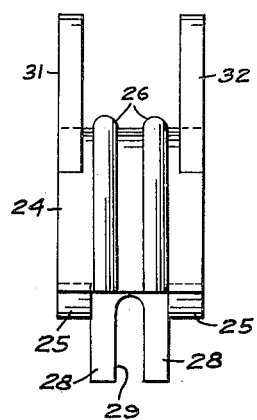
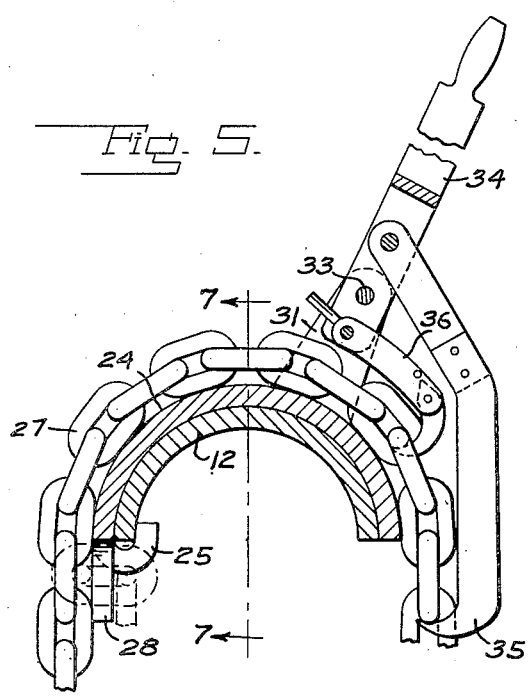
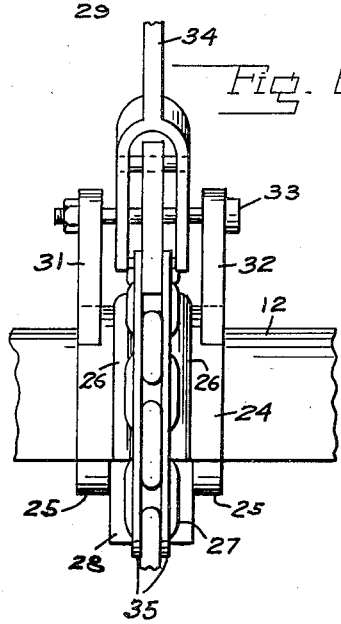
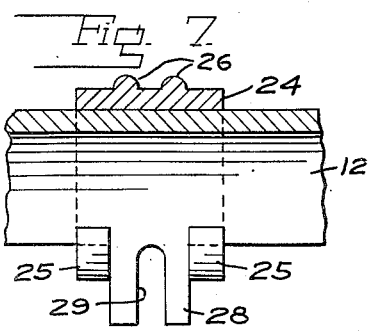
INVENTOR.
Kenneth O. Huff
BY Victor J. Evans & Co.
ATTORNEYS Patented Feb. 7, 1950

2,496,537

UNITED STATES PATENT OFFICE 2,496,537

SELF-LOCKING CHAIN HOIST TRAILER

Kenneth O. Huff, Dodge City, Kans.

Application November 17, 1947, Serial No. 786,384

1 Claim. (Cl. 214—75)

This invention relates to a self-locking chain hoist.

It is an object of the present invention to provide a trailer which is adapted for transporting agricultural implements and wherein there is provided on said trailer a hoisting arrangement for elevating the implement when located within the sides of the trailer to a transport position thereof.

Other objects of the present invention are to provide a trailer particularly adapted for transporting agricultural implements, which is of simple construction, easy to operate, inexpensive to manufacture, convenient to use and efficient in operation.

For a better understanding of the invention, reference may be had to the following detailed description taken in connection with the accompanying drawing, in which Figure 1 is a side elevational view of the trailer with an agricultural implement partly elevated thereon;

Figure 2 is a top plan view of the trailer;

Figure 3 is a rear elevational view of the trailer;

Figure 4 is a side elevational view of one of the chain hoist brackets;

Figure 5 is an enlarged cross-sectional view taken through one side of the trailer and the bracket and the chain hoist part and as viewed on line 5—5 of Figure 2;

Figure 6 is a fragmentary side elevational view of the side of the trailer and one of the chain hoists;

Figure 7 is a longitudinal cross-sectional view taken on line 7—7 of Figure 5.

Referring now to the figures, 10 represents a frame formed of split pipe parts 11 and 12, converging tongue parts 13 and 14 united as indicated at 15, to which there is attached a dirigible supporting wheel 16. A hitch 17 extends forwardly from the tongue part and has a pin 18 by which the trailer can be made secure to a tractor, truck, automobile or any other similar motor vehicle. The trailer thus can be safely moved over any type of road or highway, as desired. This hitch is preferably connected by a hinge 19 to the trailer, so that it can be elevated at times when not in use.

Depending from the rear of the side frame piece is a bracket 21, having an axle 22 with a wheel 23 thereon. Connected upon the side frame pieces for longitudinal adjustment therealong are chain hoist brackets 24, having hook formation 25 adapted to engage an edge under one side of the piece, as shown in Figures 5 and 7. These brackets 24 have guide portions 26 between which chain 27 is extended for movement over the bracket 24. The brackets 24 have guide portions 26 between which chain 27 is extended for movement over the bracket 24. The bracket 24 further has a bifurcated portion 28 to which chain 27 is attached as indicated in dotted lines in Figure 5. This bifurcated portion 28 seen in Figure 7 is located between the hook formation 25 and has slot 29 into which the chain is extended. Extending upwardly from the top of the bracket 24, are lugs 31 and 32 between which is extended a pivot bolt 33 on which is mounted a hand lever 34 having a hook 35 adapted to engage with the chain 27 to elevate the same. A holding hook 36, pivotally connected to the lever 34, at the opposite side of pivot pin 33, will retain the chain after it has been elevated. With the weight on the chain 27 and with the hook 36 in engagement therewith, the lever 34 can be pivoted in a clockwise or counterclockwise direction, to elevate or lower the load by engagement of the hook 35 with the chain 27. When the load is in elevated position, the load will be suspended and supported from the holding hook 36 and the hook 35 of the lever 34. When the chain is extended into the slot 29 of the bracket 24, it may be retained in any desired position, so that the pivot bolt 33 may be removed, and the lever 34 and hook 36 may be used on duplicate brackets. Connected to the lower end of the chain 27, and extending from the opposite frame pieces, are seats 37 on which one wheel of an agricultural implement 38 can be rested, as shown in Figure 1, and as the seats are elevated by the operation of the lever 34, the implements will be elevated to a position so that it can be easily transported. The implements will be retained between the side frame pieces 11 and 12 and can be easily located on opposite sides of the implement by moving the frame pieces rearwardly about the implement.

While various changes may be made in the detail construction, it shall be understood that such changes shall be within the spirit and scope of the present invention, as defined by the appended claim.

I claim:

A trailer adapted to carry heavy agricultural implements or the like comprising a frame having split pipe side pieces, a tongue extending forwardly from the side of frame pieces, a hitch device on the top adapted to connect the same with a tractor, truck or automobile, ground supporting means connected to the forward part of the frame for supporting the same, individual ground supporting means connected to the rear end of each of the side pieces, said side frame pieces being adapted to receive the article between them and hoist devices at opposite ends of the frame and connected to the side frame pieces for longitudinal adjustment thereon and adapted to engage the article to elevate the same, each of said hoist devices comprising a bracket of half-circular section and adapted to fit over the split pipe piece for longitudinal adjustment along the same, said bracket having a projection for engaging one side edge of the pipe and a portion for retaining one end of a chain, a lever pivoted on the bracket and having locking and elevating chain dogs adapted to engage with the chain to retain the same or elevate it, and a seat to hold the article, said seat being connected between chains suspended respectively from opposite brackets on the respective opposite sides.

KENNETH O. HUFF.

REFERENCES CITED

The following references are of record in the file of this patent:

UNITED STATES PATENTS

| Number | Name | Date |
|---|---|---|
| 537,628 | Boudinot | Apr. 16, 1895 |
| 703,186 | Clark | June 24, 1902 |
| 2,164,550 | Steward | July 4, 1939 |
| 2,240,564 | LeTourneau | May 6, 1941 |
| 2,377,201 | Baird | May 29, 1945 |
| 2,399,304 | Watkins | Apr. 30, 1946 |
| 2,444,690 | Almendinger et al. | July 6, 1948 |